D. S. & J. D. HEEBNER.
Said D. S. HEEBNER Assignor of two-thirds to I. D. HEEBNER & W. D. HEEBNER, and said J. D. HEEBNER Assignor to I. D. HEEBNER, W. D. HEEBNER, and D. S. HEEBNER.
Horse Powers.
No. 9,488. Reissued Dec. 7, 1880.
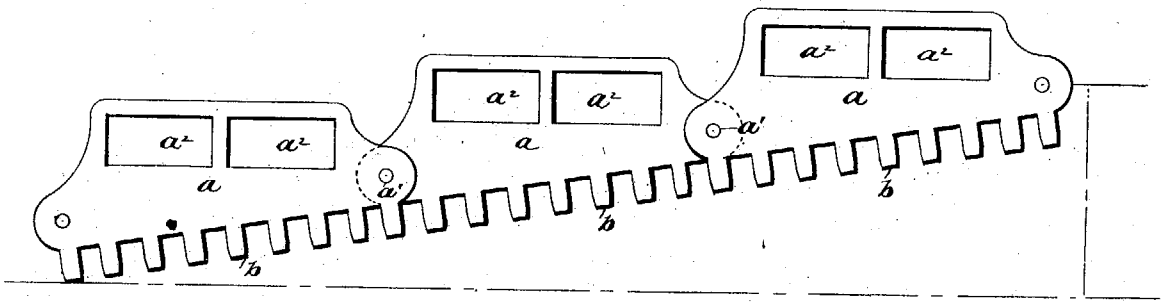
Attest.
W. H. H. Knight,
Fred F. Church.
Inventors,
David S. Heebner and
Josiah D. Heebner.
By Hill & Church
Their Attys.
N. PETERS, PHOTO-LITHOGRAPHER, WASHINGTON, D. C.

UNITED STATES PATENT OFFICE.

DAVID S. HEEBNER AND JOSIAH D. HEEBNER, OF LANSDALE, PENNSYLVANIA; SAID DAVID S. HEEBNER ASSIGNOR OF TWO-THIRDS TO ISAAC D. HEEBNER AND WILLIAM D. HEEBNER, AND SAID JOSIAH D. HEEBNER ASSIGNOR TO ISAAC D. HEEBNER, WILLIAM D. HEEBNER, AND DAVID S. HEEBNER, ALL OF SAME PLACE.

HORSE-POWER.

SPECIFICATION forming part of Reissued Letters Patent No. 9,488, dated December 7, 1880.

Original No. 120,066, dated October 17, 1871. Application for reissue filed October 18, 1880.

*To all whom it may concern:*

Be it known that we, DAVID S. HEEBNER and JOSIAH D. HEEBNER, formerly of Norristown, in the county of Montgomery and State of Pennsylvania, but now of Lansdale, in said county and State, have invented certain new and useful Improvements in Horse-Powers; and we do hereby declare the following to be a full and exact description of the same, reference being had to the accompanying drawing, forming part of this specification, in which the figure represents a view of several sections or links of one of the endless chains to which the foot-boards or lags are applied.

This invention relates to that class of horse-power treads in which the endless platform on which the horses work is arranged in an inclined position; and it consists, primarily, in making the tread-surfaces of such inclined platform horizontal, so as to afford level footholds for the horses and relieve them of that strain to which they are subjected when standing upon inclined surfaces, as in prior inventions of this class.

The invention further consists in the combination, with inclined endless chains, of lags or tread-boards applied to the links of said endless chains, and having horizontal tread-surfaces.

It further consists in providing the links of the inclined endless chains with one or more horizontal slots or openings for the reception of the ends of the lags or foot-boards.

It further consists in constructing each link of the inclined endless chain with one or more horizontal slots or openings for the reception of the lags or foot-boards and with teeth or cogs for engagement with the driven gear.

Referring to the drawing, *a* represents the individual links of one of the endless chains of an inclined endless platform, the said links being articulated together at *a'*, as shown. Each link is made higher at one end than at the other, so as to bring their outer edges horizontal, and it is provided with horizontal slots or openings $a^2$, for the reception of the end of the lag or foot-board, and is further provided on its inner edge with drive-teeth *b*, as shown.

The endless platform constructed in this manner has the appearance of a pair of stairs, the tread-surfaces of the lags or tread-boards being flat and horizontal and affording a firm and secure foothold for the horses.

We claim as our invention—

1. In a horse-power tread, an endless platform adapted to travel in an inclined position, and having horizontal footholds or tread-surfaces, substantially as described, for the purpose specified.

2. In a horse-power tread, the combination, with endless chains adapted to travel in inclined positions, of lags or tread-boards applied to the links of said endless chains, and having horizontal tread-surfaces, substantially as described.

3. In a horse-power tread, endless chains adapted to travel in inclined positions and having horizontal slots or openings for the reception of the lags or tread-boards, substantially as described.

4. In a horse-power tread, endless chains adapted to travel in inclined positions and composed of links which are made higher at one end than at the other, and are provided with horizontal openings for the tread-boards, substantially as described.

5. In a horse-power tread, the links of an endless chain adapted to travel in an inclined position, having horizontal openings for the accommodation of the lags or tread-boards, and provided with teeth on their inner edges, substantially as described.

DAVID S. HEEBNER.
JOSIAH D. HEEBNER.

Witnesses:
E. E. BURRISS,
HENRY D. TIESEL.